US012769794B2

(12) United States Patent
Roy et al.

(10) Patent No.: US 12,769,794 B2
(45) Date of Patent: Oct. 20, 2026

(54) METHODS AND SYSTEMS FOR CONTROLLED MODELING AND OPTIMIZATION OF A NATURAL LANGUAGE DATABASE INTERFACE

(71) Applicant: Chata Technologies Inc., Calgary (CA)

(72) Inventors: Suryatapa Roy, Calgary (CA); Nicholas Daniel Nygren, Calgary (CA); Joshua David Sirota, Calgary (CA); Kelly Cherniwchan, Calgary (CA); Reggie Leander Ouellette, Calgary (CA)

(73) Assignee: Chata Technologies Inc., Calgary (CA)

( * ) Notice: Subject to any disclaimer, the term of this patent is extended or adjusted under 35 U.S.C. 154(b) by 87 days.

(21) Appl. No.: 18/277,895

(22) PCT Filed: Feb. 18, 2022

(86) PCT No.: PCT/CA2022/050246

§ 371 (c)(1),
(2) Date: Aug. 18, 2023

(87) PCT Pub. No.: WO2022/174356

PCT Pub. Date: Aug. 25, 2022

(65) Prior Publication Data

US 2024/0184829 A1 Jun. 6, 2024

Related U.S. Application Data

(60) Provisional application No. 63/151,488, filed on Feb. 19, 2021.

(51) Int. Cl.
*G06F 16/00* (2019.01)
*G06F 16/9032* (2019.01)

(52) U.S. Cl.
CPC .............................. *G06F 16/90332* (2019.01)

(58) Field of Classification Search
None
See application file for complete search history.

(56) References Cited

U.S. PATENT DOCUMENTS 6,598,039 B1 * 7/2003 Livowsky ............. G06F 16/335
7,895,191 B2 * 2/2011 Colossi ............... G06F 16/2462 707/600

(Continued)

OTHER PUBLICATIONS

Ursin Brunner et al: "ValueNet: A Neural Text-to-SQL Architecture Incorporating Values"—May 29, 2020.

(Continued)

*Primary Examiner* — Jean M Corrielus
(74) *Attorney, Agent, or Firm* — McCarthy Tétrault LLP; Amy Fong

(57) ABSTRACT

Systems and methods are disclosed for training and deployment of machine learning-based models that dynamically translate natural language to database query language, and include automation of training data generation, query representation language, and adaptive model training. A method for generating datasets for a natural language interface to a database includes a database query builder, which receives insights regarding the database, and based at least in part on the database insights builds a plurality of database queries. The method further includes generating a data distribution of natural language queries paired with corresponding database queries by, for each one of the plurality of database queries, pairing the database query to a natural language query and one or more paraphrases of the natural language query, and projecting the data distribution onto a plurality of segmented text distributions and applying one or more control signals to generate an optimal training data distribution.

22 Claims, 9 Drawing Sheets

(56) References Cited

U.S. PATENT DOCUMENTS

| | | | | |
|---|---|---|---|---|
| 9,959,311 | B2 * | 5/2018 | Boguraev | G06F 40/279 |
| 10,546,001 | B1 * | 1/2020 | Nguyen | G06F 16/243 |
| 11,023,486 | B2 * | 6/2021 | Agrawal | G06F 16/2465 |
| 11,604,790 | B2 * | 3/2023 | Ranganathan | G10L 15/22 |
| 11,620,306 | B2 * | 4/2023 | Agrawal | G06F 16/2465 707/722 |
| 11,934,403 | B2 * | 3/2024 | Rodriguez | G06N 20/00 |
| 12,554,740 | B2 * | 2/2026 | Agrawal | G06F 16/2465 |
| 2004/0117189 | A1 * | 6/2004 | Bennett | G06F 16/243 704/E15.04 |
| 2005/0080614 | A1 * | 4/2005 | Bennett | G06F 16/243 704/E15.04 |
| 2005/0080625 | A1 * | 4/2005 | Bennett | G10L 15/183 704/E15.047 |
| 2005/0086049 | A1 * | 4/2005 | Bennett | G06F 16/243 704/E15.04 |
| 2005/0086059 | A1 * | 4/2005 | Bennett | G06F 16/243 704/E15.04 |
| 2008/0300878 | A1 * | 12/2008 | Bennett | G06F 16/243 704/E15.04 |
| 2009/0157401 | A1 * | 6/2009 | Bennett | G06F 16/24522 704/243 |
| 2010/0005081 | A1 * | 1/2010 | Bennett | G06F 16/243 704/9 |
| 2012/0136649 | A1 * | 5/2012 | Freising | G06F 16/3334 704/9 |
| 2012/0265531 | A1 * | 10/2012 | Bennett | G06F 16/24522 704/E15.005 |
| 2013/0262361 | A1 * | 10/2013 | Arroyo | G06F 16/245 706/46 |
| 2014/0379725 | A1 * | 12/2014 | Choe | G06F 16/2228 718/104 |
| 2016/0179934 | A1 * | 6/2016 | Stubley | G06F 16/243 707/722 |
| 2017/0364931 | A1 * | 12/2017 | Khavronin | G06F 16/3346 |
| 2018/0089572 | A1 * | 3/2018 | Aili | G06F 9/453 |
| 2018/0203924 | A1 * | 7/2018 | Agrawal | G06F 16/24522 |
| 2018/0293300 | A1 * | 10/2018 | Liu | G06F 16/3329 |
| 2018/0336198 | A1 * | 11/2018 | Zhong | G06F 16/24522 |
| 2019/0095500 | A1 * | 3/2019 | Pandey | G06F 16/288 |
| 2019/0266163 | A1 * | 8/2019 | Johnson | G06F 16/248 |
| 2020/0012638 | A1 * | 1/2020 | Luo | G06F 16/243 |
| 2020/0019546 | A1 * | 1/2020 | Luo | G06F 16/245 |
| 2020/0034362 | A1 * | 1/2020 | Galitsky | G06F 40/247 |
| 2020/0134067 | A1 | 4/2020 | Mllard et al. | |
| 2020/0151154 | A1 * | 5/2020 | Kumar | G06F 16/211 |
| 2020/0151166 | A1 * | 5/2020 | Shekhar | G06F 16/22 |
| 2020/0151191 | A1 * | 5/2020 | Agrawal | G06F 16/2465 |
| 2020/0184158 | A1 * | 6/2020 | Kuczmarski | G06F 16/3329 |
| 2020/0250163 | A1 * | 8/2020 | Kuimelis | G06F 16/2272 |
| 2020/0293712 | A1 * | 9/2020 | Potts | G16H 10/60 |
| 2020/0364953 | A1 * | 11/2020 | Simoudis | B60K 35/00 |
| 2020/0401590 | A1 * | 12/2020 | Staar | G06F 40/30 |
| 2021/0125030 | A1 | 4/2021 | Lazaro-Gredilla et al. | |
| 2021/0311935 | A1 * | 10/2021 | Agrawal | G06F 16/2465 |
| 2021/0397610 | A1 | 12/2021 | Singh et al. | |
| 2023/0259525 | A1 * | 8/2023 | Agrawal | G06F 16/2465 707/603 |

OTHER PUBLICATIONS

Bazaga Adrian et al: “Translating synthetic natural language to database queries with a polyglot deep learning framework” —Jan. 1, 2021.

* cited by examiner

METHODS AND SYSTEMS FOR CONTROLLED MODELING AND OPTIMIZATION OF A NATURAL LANGUAGE DATABASE INTERFACE

TECHNICAL FIELD

The present disclosure relates generally to model management for a natural language interface to a database system. Particular embodiments are directed to query representation language, training-data generation, model inferencing for data access, and model optimization.

REFERENCE TO RELATED APPLICATION

This application claims priority from U.S. Patent Application No. 63/151,488 filed on Feb. 19, 2021 entitled "METHODS AND SYSTEMS FOR GENERATING DATASETS FOR A NATURAL LANGUAGE DATABASE INTERFACE". For the purposes of the United States, this application claims the benefit under 35 U.S.C. § 119 of U.S. Patent Application No. 63/151,488 filed on Feb. 19, 2021 entitled "METHODS AND SYSTEMS FOR GENERATING DATASETS FOR A NATURAL LANGUAGE DATABASE INTERFACE". U.S. Patent Application No. 63/151,488 is incorporated herein by reference in its entirety for all purposes.

BACKGROUND

In building an application programming interface (API) for translating a natural language query to database query language (NL2DBQL), including for a multilingual natural language to multiple database query language translation system, significant challenges arise from the diversity in database structures and the radical variation in the design of different databases across different organizations. The disconnect between the different database structures makes it difficult to find automated solutions to many problems such as generation of domain-specific keywords, meanings and relationships; interpretation of the logical and semantic relations between database entities and human-understandable glossary associated with a particular database, importance assessment of entities in databases, etc. These problems need robust solutions and affect the human-usability of a NL2DBQL API, particularly given the high degree of implicitness and ambiguity in the usage of different glossary terms across diverse domains and user-groups. Industry standard solutions are oftentimes customized and extended by partner organizations in ways that may not adhere to the standards. Furthermore, the different standards across different competitors are not always aligned, which can lead to downstream complications for a NL2DBQL API.

Recorded human behavior, and hence, available data for training language generation or translation language model, are generally biased in one way or another. Therefore, natural language processing (NLP) applications suffer from data driven performance biases. These biases include, among others, gender biases in text article generation applications, performance biases towards certain spoken languages, accents in dialogue applications, and the like. It is a difficult problem to generate balanced and unbiased training data in a way that improves generalization for language models across different applications and/or user-groups. While conventional methods such as SMOTE (Synthetic Minority Oversampling Technique) (which uses projection and extrapolation techniques for balancing input data against multiple classes) have been used successfully in other applications, SMOTE techniques yield less than optimal results for natural language query balancing. Recent SOTA (State Of The Art) techniques have addressed some of the problems of data balancing for NLP applications. However, these are yet to achieve the degree of controllability necessary for industrial applications of a NL2DBQL API.

Human interactions with computing systems have distinct characteristics that vary widely between user groups based on various social, economic, geographical and cultural factors. For example, people working in a scientific domain might use technical glossary (explicit) terms to refer to different tools and devices, while people working in an advertising and marketing domain might describe the same tools in descriptive (implicit) terms indicating the functionality or usage of said devices. Usage of keywords, grammar, language fluency, etc., vary widely between different end user groups over different business domains and different languages. Typically, data generation pipelines are designed in such a way that unintentionally fit to undesired and uncontrollable biases and hence subsequent NLP models often deliver a different user experience (ease of use and interactivity) to different user-groups. This poses practical challenges to the usability and user-satisfaction of such models in industrial applications. For example, if the training data is biased to the language syntactic of a scientific domain, a user in the marketing domain may have sub-optimal interaction experience. A NL2DBQL API must adapt training data and models seamlessly with a high degree of precision and control in an automated fashion for different user groups, to maximize interactivity and usability of said API.

For a natural language to Structured Query Language (SQL) parsing application, techniques demonstrated on simple database structures and academic datasets have limited applicability for industrial applications on large and complex cross-organizational databases that are continually updated and restructured and for diverse use-cases requiring a high degree of precision and control.

In existing applications for natural language to query language parsing that are current industry standards, data scientists typically use intent-based classification techniques to build natural language interfaces to operational databases and utilize the intent classification outputs of that model to feed into a rule-based query generation system or they write the natural language questions and corresponding database queries from scratch repeatedly for every business requirement. This process is very time consuming and lacks critical capabilities in handling ambiguous and implicit natural language queries when entity features do not exist for the classification task. This often results in developers and engineers developing hand-crafted solutions for data labeling, model training and testing for different use-cases. The standards for accuracy, precision and recall for these models are quite low (in most cases, accuracy <80%). Other architectures being researched in academia utilize transformer language models to generate a specific database query language per model, such as Structured Query Language (SQL), Mongo Query Language (MQL), etc., and such models do not generalize to more than one type of database at a time. Variants of such architectures operate on the natural language query and database schema, jointly embedding the two. Using these architectures, the entire schema needs to be embedded and processed for each query. This is feasible only for small databases with a few tables and columns, but not for typical cross-organizational databases, which may contain thousands of tables and columns. Therefore, these architectures are not scalable, cannot be used to generalize to different database query languages and do not deliver the required response times that would be deemed acceptable for a NL2DBQL API.

Some systems that propose solutions for automated query development use simple slot-filling techniques. Such systems also fail to satisfactorily scale for complex cross-organizational databases, queries and business requirements. There are no existing systems that can auto-assist a human in data labeling or complex query writing for training an industrial NL2DBQL model.

In research, logical query representation language generation methods generate a final representation much like SQL for execution against databases. Such representation languages fail to adequately abstract complex join-path relations, nester sub queries and lack support for diverse types of arithmetic functions. Such logical languages are also verbose where a large number of logical tokens have to be stored and generated. Thus, such languages fail to achieve any significant compression, performance benefits or cross-database transferability. Such languages and associated systems also do not address some of the challenges that arise from the lack of standardization across different industrial data models.

The generation of any training data for a deep learning language model can be a very time-consuming task in an end-to-end model training process and often involves a significant amount of manual work. One of the key challenges in training-data generation for a NL2DBQL model is correcting for bad query generation (i.e., query that either does not execute properly on a database or returns an unexpected result). Bad queries can get created in several scenarios: a human (trainer/API integrator) may make a syntactic mistake in writing a query; they may also make a mistake in interpreting a business requirement into a database query; the underlying database schema may change due to a restructuring or modification of the database; an automated query generation or recommendation system may be inaccurate and make errors of varying degrees that a human would have to rectify. In all such scenarios, it would be time-consuming and ineffective to correct such mistakes after a model has been trained using any of the existing query abstraction techniques. There are no existing query abstraction techniques that can accommodate a re-tuning of an already trained model as and when the requirements for database queries change or need corrections or adjustments.

Conventionally, one way of doing controlled training of industrial task-specific deep learning models involves a data scientist manually curating training data, performing feature engineering, using different sampling strategies, and training different model architectures with different hyperparameter combinations. This is done over many iterations to obtain a satisfactory performance on a fixed measurement metric, and then the best model is deployed for usage. Another way of doing controlled training of industrial task-specific deep learning models involves a separate training/engineering/MLOps (Machine Learning/Operations) team that is responsible for training and managing models once a model is released in a pre-trained state by a research/data science team. In this method, there are several manual operations where the training team looks at customer usage (end user) data and continuously tweaks the training data and hyperparameters to improve the performance of a model and then redeploy it for usage. Both these practices involve dedicated infrastructure and time-consuming processes that cause significant delays in deploying new requirements or model adjustments.

With existing automated machine learning (AutoML) APIs, it is generally the responsibility of the integrator to manually curate a good dataset with or without manual support from different service providers. In addition, such APIs provide automated support for a limited number of academic machine learning tasks. This poses several practical challenges to integrators without dedicated data science teams, for developing usable models using these APIs. This is particularly a challenge for deep learning NLP applications where data largely governs the system performance.

Exploratory Model Analysis (EMA) solutions focus on model analysis in terms of activations and training performance but these do not perform any causal analysis of failures or take any automated remedial action. Interpreting the visualizations generated by existing EMA techniques often requires technical know-how and has many usage biases. Such systems lack automated inference or predictive capabilities based on the model analysis for guiding a non-expert in training optimized models.

Variational Auto Encoders (VAEs) and Generator Discriminator Networks (GANs) employ different forms of compression and sampling techniques where one model generates data and another model learns to discriminate (correctly classify) this generated data in a completely end-to-end automated process. However, for natural language processing and translation tasks, there are many shortcomings of such architectures where one learned generation model trains another task-specific model. These suffer from performance, reproducibility and controllability issues and any minor change in the task outcome requires an entirely different setup, initialization and optimization process. This makes such end-to-end automated architectures impractical for industrial NL2DBQL applications.

There is a need for methods and systems which address the aforementioned problems for a natural language interface to a multiple database system.

SUMMARY OF THE DISCLOSURE

In general, the present disclosure relates to systems and methods for controlled modeling, training and deployment of machine learning-based models that translate natural language queries to database query languages (NL2DBQL). Embodiments described herein relate to an automated control-system for an executable builder of database query representation languages, training data generation, model monitoring, and continuous model improvement.

One aspect provides a method for automatically generating datasets for a natural language interface to a database. The method includes providing a database query builder, wherein the database query builder receives insights regarding the database, and based at least in part on the database insights builds a plurality of database queries in a query representation language which takes the form of an executable state graph. The method also includes generating a training data distribution of natural language queries paired with corresponding executable state graphs by pairing the representation query to a natural language query and one or more its paraphrases. The method also includes projecting this generated data onto several segmented text distributions, such as alternate n-gram distributions, and applying one or more optimization signals to automatically and adaptively determine an optimal training data distribution. The specific n-gram distributions may bear special relevance to different user groups and/or business domains. The method further includes differential control over the optimal training data distribution for different user groups and application domains.

In particular embodiments, the method includes building knowledge graphs that are specially architected for different business domains and user groups. In some embodiments, this entails a process of domain-specific data mining from open-source text data as well as organization-specific proprietary documentations that are provided by integrators.

In particular embodiments, the method further includes modeling of cause-effect (causal) relations between one or more combinations of database attributes, real world entities, news, facts, events, activities, transactions, user-actions, user-queries, user-sentiments, user-satisfaction, etc. Such causal features may be generic, domain-specific, integrator-specific or user-specific. Such casual features are, in some embodiments, integrated into the knowledge graphs. The causal knowledge graphs may be used to generate training dataset of natural language and representation query pairs, to optimize training data distribution of natural language to database query language model, etc.

In particular embodiments, the method includes employing statistical language models, knowledge graphs and/or neural network language models to standardize naming conventions, glossary term distributions, data types and data formats used across diverse cross-organizational databases to generate a unified logical data model.

In particular embodiments, the method further includes generating insights about an organization or business domain through the standardization process of a database schema.

In particular embodiments, the database queries include a plurality of seed queries, each one of the seed queries mapping a subject in a logical data model to a physical data model as a topical cluster of one or more database entities.

In particular embodiments, the method includes building diverse database queries that meet different business requirements by performing semantic multiplication of the seed queries.

In particular embodiments, the method includes providing suggestions for seed queries and/or receiving feedback/correction/interventions from a human trainer to drive business value of a NL2DBQL API.

In particular embodiments the method includes translating the seed queries into compressed query representations called Proto Query Representation (PQR) and representing each one of the multiplied database queries as a dynamic PQR state in a graph with one or more pending transformations or modifications. The graph may support a large number of nodes, each performing a join operation, a nested sub-query, or a mathematical transformation.

In particular embodiments, the method includes generating future nodes for one or more pending transformations in the PQR state graph wherein each new node signifies a dynamic new augmentation to form a database query paired with a corresponding natural language query for training a NL2DBQL model. The database query is in multiple database query languages in some embodiments.

In particular embodiments, the method includes determining one or more paraphrases of the natural language query by employing statistical language models, knowledge graphs and/or neural network paraphraser language models. The paraphrases are multilingual paraphrases in some embodiments.

In particular embodiments, the method includes generating a plurality of natural language queries targeting different user groups across business domains, adapting training data distributions through new algorithms for text augmentation, categorizing, embedding, ranking, sorting and/or filtering the plurality of database queries.

In particular embodiments, the method includes generating optimal training data distributions using new algorithms and neural network models for text segmentation, projection, sampling, similarity matching and data mapping.

In particular embodiments, the method includes generating a balanced and unbiased training data distribution by transforming the modified segmented text distribution from its projections back into pairs of natural language queries and database queries.

In particular embodiments, the method further includes generating a balanced training data distribution with characteristic and desirable language biases to adapt to particular business applications and/or user groups.

In particular embodiments, the method includes generating new test data distributions and/or extending an existing test data distribution by projecting the test data distribution to the same segmented text distribution as a training data and using statistical language modeling and/or knowledge graphs.

A further aspect provides a method for optimizing a natural language to database query language ("NL2DBQL") model for a database through a feedback loop. The method includes receiving an initial balanced corpus of training data for the model; applying the corpus of training data to train the model; projecting the data distribution of the training data onto a segmented text distribution and applying control signals throughout the training process to adaptively determine training data optimality by failure analyses that assess the model's performance on different distributions of validation and test datasets. The feedback loop may be an automated training feedback loop.

In particular embodiments, the method includes providing the control signals from one or more of a training data balancer, a causal knowledge database, a model training system, a failure analysis system, and a model activation monitoring system. In some embodiments, the method includes analyzing, by the failure analysis system, validation and test case failures and using the model activation monitoring system to adaptively correct for sub-optimal training data though a feedback process to one or more of the upstream systems that build new augmentations on the PQR state graph, create new pluralities of natural language queries, change segmented text distributions, and generate different balanced training data distributions. The different distributions may cause differed model activation patterns.

In particular embodiments, the method includes controlled tuning of a number of hyperparameter settings in adaptively determining data optimality for a segmented text distribution. The hyperparameter settings may include one or more of: number of nodes in the PQR state graph, number of natural language pluralities, heterogeneity of segmented text distributions, data mapping factor for logical data model, data mapping factor for knowledge graphs, batch augmentation policy of training data distributions, batch-size of training data, choice of optimization algorithm, learning rate of an optimization algorithm, settings for early stopping, and confidence thresholds for failure analysis.

In particular embodiments, the method includes obtaining recorded end user data (e.g., from front end interfaces) and using the end user data to add test cases to the training feedback loop, seed a test data generator, and/or for distribution matching between an output of a test data generator and pre-recorded end user data to control test data sampling.

In particular embodiments, the method includes obtaining new test data from a human trainer in the loop feedback system and adapting the model failure analysis to the updated trainer's test cases throughout the model training process.

Another aspect provides a method for generating a database query in multiple database languages. The method involves receiving a natural language query from an end-user; passing the query through a NL2DBQL model (e.g., a casual knowledge graph augmented NL2DBQL model) to generate a PQR state graph. This PQR state graph can then be passed through a post-processor that converts it to a specific query language executable against a standard database. The post-processor may be given a set of syntactic configurations to convert it into the specific query language executable against a specific database or a multiple of syntactic configurations to generate multiple query languages for different databases.

In particular embodiments, the method for converting PQR to a specific query language can accommodate dynamic modifications and restructuring of databases, query corrections and modifications for data transformation at run time without having to retrain a model.

Another aspect provides a method for generating a database query for a database from a natural language query. The method includes receiving a natural language query from a user, and based on the natural language query, generating a database query by: (i) performing text-preprocessing of the natural language query by identifying unique canonical entity names and attributes existing in the database and identifying language components associated with domain, user-preferences, date and/or time; (ii) translating the output of the text-preprocessing to a PQR; and (iii) applying the output of the text-preprocessing to populate, within a PQR outputted by the translation model, parameters for pending transformations to generate a query in the query language of the database (i.e., a particular language for a given database). In some embodiments, the method involves passing the language components through a causal knowledge graph augmented translation model for translating the output of the text-preprocessing to a query representation.

Another aspect provides a computer-implemented method of accessing data stored in a database. The method involves the steps of receiving a query in a natural language, passing the query through a neural parser model to generate a proto query representation of the query, translating the proto query representation to a database query in the language of the database, and executing the database query to access the data stored in the database. The neural parser model is trained with training data generated from a subject seed query derived at least in part from a knowledge graph.

In some embodiments, the knowledge graph includes cause-effect relationships between database attributes and attributes from temporal knowledge sources. The cause-effect relationships may be established by performing correlation and/or causality analysis on one or more combinations of the temporal knowledge sources. The cause-effect relationships may be established by performing an analysis of the temporal knowledge sources under a domain-specific application.

In some embodiments, the query is pre-processed to obtain a hashed logical query and domain information prior to passing the hashed logical query through the neural parser model. In such embodiments, the neural parser model may comprise a natural language encoder for encoding the hashed logical query through a knowledge augmented attention mechanism and a PQR decoder for decoding the knowledge augmented encoding into the proto query representation. The natural language encoder may utilize the domain information and the knowledge graph to generate one or more embeddings associated with the hashed logical query. The natural language encoder may concatenate the embeddings to generate the knowledge augmented encoding.

Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

Each of FIGS. 1A and 1B (collectively with FIG. 1C, FIG. 1) shows a flowchart of an overall process as implemented by methods and systems described herein, wherein.

Each of FIGS. 3A and 3B (collectively, FIG. 3) shows a flowchart of the functionalities of Proto Query Representation (PQR), wherein.

DETAILED DESCRIPTION

The description which follows and the embodiments described therein are provided by way of illustration of examples of particular embodiments of the principles of the present invention. These examples are provided for the purposes of explanation and not limitation of those principles and of the invention.

Through Application Programming Interface ("API") call generation, a natural language query such as "All sales made last month" can be translated to a query in the native database query language so that it can be executed to output the requested data from a particular database system. Embodiments of the invention incorporate training and deployment of machine-learning based models for dynamically translating a query in natural language ("NL") to a corresponding query in database query language ("NL2DBQL"). Specific embodiments are directed to an integrated control-system for the automation of training data generation, adaptive model training, and query representation language. Certain embodiments provide an end-to-end automated system including a database (DB) insights engine that uses data cleaning, data provenance, data management and natural language generation to build a unified data adapter for the NL2DBQL API for any database.

Figure 1A:
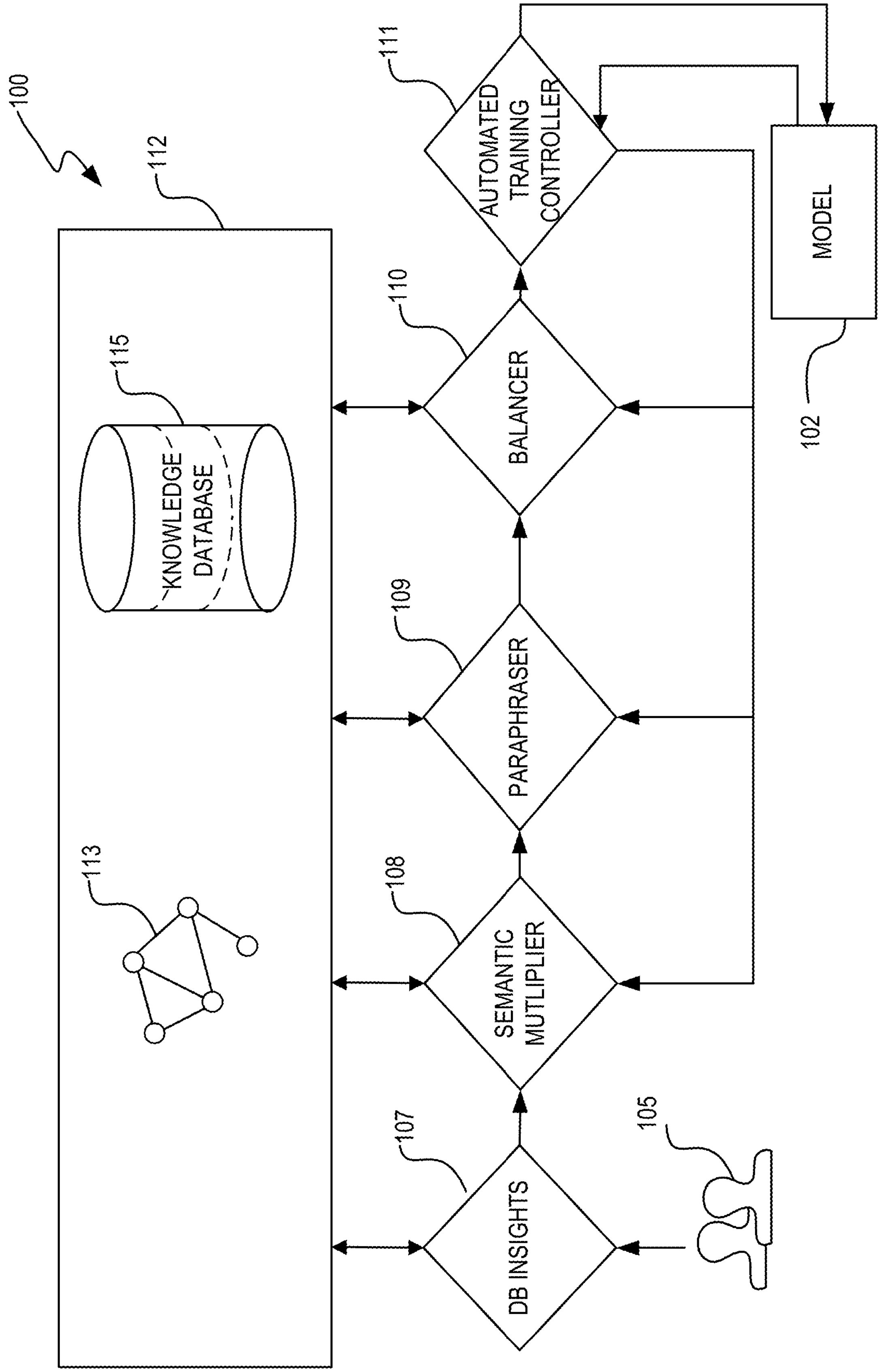
FIG. 1A shows a flowchart for training data generation and model training and FIG. 1B shows a flowchart for model inference.

To implement a NL2DBQL API for a database, training data is generated and used to build a trained model for translating a natural language query to database language query. FIG. 1A is a flowchart showing the steps that are implemented in a training data generation process 100 according to an embodiment of the invention. The data generation process 100 results in a trained model 102 for performing NL2DBQL. The data generation process 100 begins with insights on a database schema and data model derived by a database insights engine 107. The data insights are provided by users 105 and/or from one or more data sources 112. Data sources 112 include graphs 113 and one or more databases 115 (which may include a knowledge base). Data provided to the database insights engine 107 is used as an input to build training data (i.e. natural language queries paired with corresponding database language queries). Additional training data may be generated through semantic multiplication 108 and a paraphraser 109. A balancer 110 may be used along with an automated training controller 111 to balance the training data and control and adjust for biases in the training data. In addition, at each of the steps in the process 100, data may be provided to or from the data sources 112 for further generation or refinement of the training data. Each of the aforementioned steps are explained in further detail below.

Figure 1B:
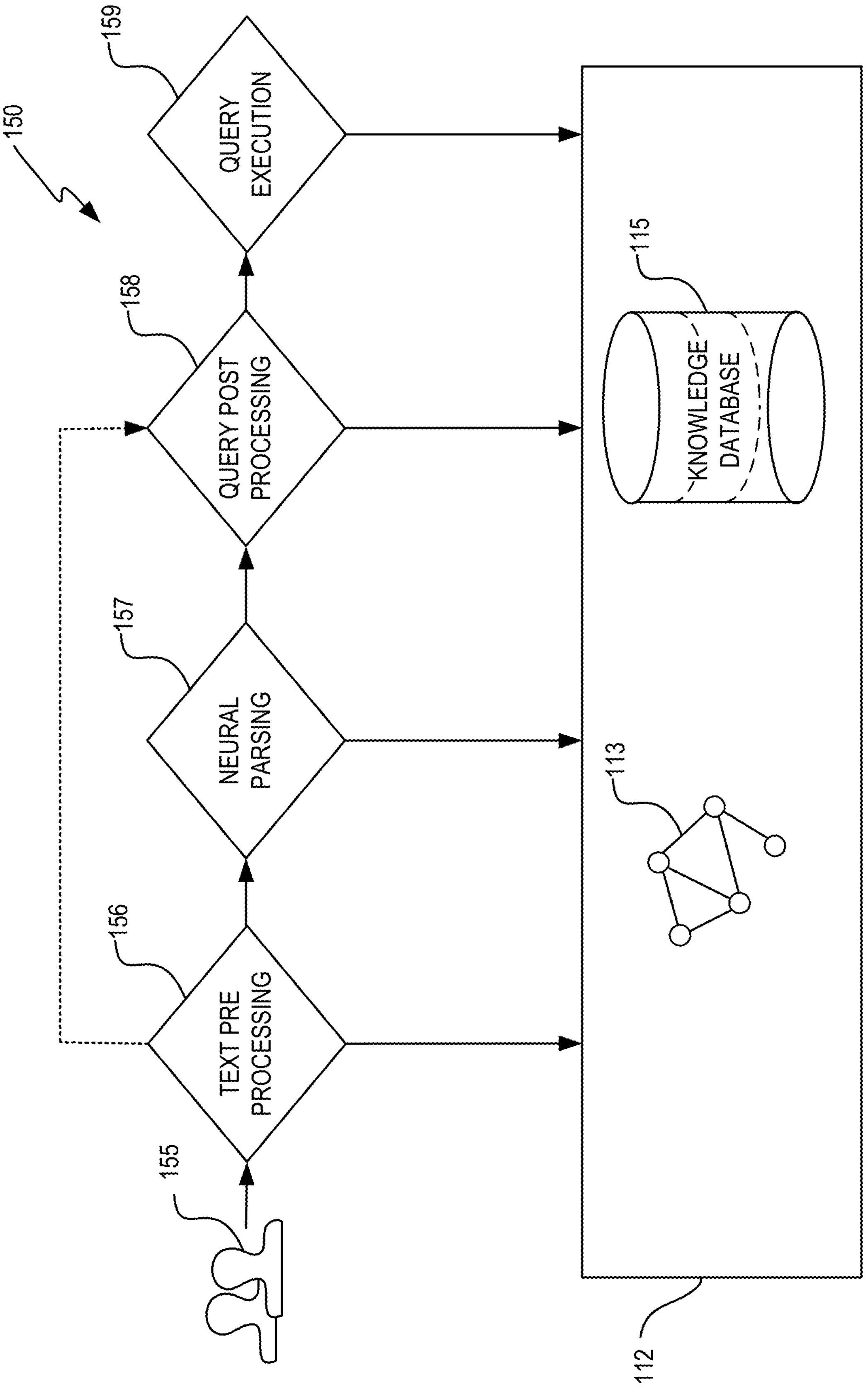

FIG. 1B is a flowchart showing the steps that are implemented in the process of model inference 150 wherein a natural language query provided by a user 155 is translated to a database language query that can then be executed to call particular data sets from a database. Model inference 150 begins with user 155 providing a natural language query for text pre-processing at block 156. Model inference 150 then proceeds to a neural parser step at block 157 and query post processing step at block 158. Database query execution 159 can then be performed using the database language query and/or a database representation queries.

At block 156, a Text Pre-processor (TPreP) performs one or more of the following functions: (1) identify, in the natural language query, any unique canonical names that exist in the database (e.g. the name of a specific customer, product, vendor, etc. that uniquely exists in the database), (2) identify, in the natural language query, any language components that have to do with DateTime (e.g. Jan. 5, 2021, 05/01/2021, etc.), (3) determine the business domain in which user 155 is operating, and (4) determine user preferences and biases from query history. For example, the TPreP may replace unique names and DateTimes with variables and generate a hashed natural language query representation of the variables. The TPreP uses a number of methods to implement functions (1) and (2), however, a key component is a disambiguation model that not only determines where in the natural language query the unique names/DateTimes are, but what the most probable term is.

An example illustrating a functionality that may be performed at block 156 is provided below (where anything between < > represents a variable for the unique term/DateTime):

User Query (natural language query): Total sales for CustomerXYZ last month

Post TPP: Total sales for <customer><dateTime>

Another example, below, shows TPreP performing another functionality to disambiguate what user 155 is asking for:

CustXYZ does not exist in the database as the correct term is CustomerXYZ.

User Query: Total sales for CustXYZ last month

TPP response to User suggests CustomerXYZ to the user. User selects it.

Post TPP: Total sales for <customer><dateTime>

In both examples the canonical term for <customer> may be sent to the Text Post-processor (TPostP) where it is re-inserted into the generated SQL as is the <dateTime>. The Knowledge Base/Graphs may be used in the location detection in the query, and to disambiguate any unique term or dateTime in the query. Knowledge derived in certain domains, similar customers, etc., can be used to change the probability calculations so the user gets the correct term they are looking for.

At block 157, the Neural Parser (NP) receives as input the output from the TPreP (i.e., output from block 156). NP translates the output from TPreP (e.g., a hashed natural language query representation of variables) to a protoquery representation (PQR) (PQR is explained in further detail below with reference to FIG. 3A).

At block 158, the Text Post-processor (TPostP) changes the PQR to one or more source database query languages (e.g., SQL, MQL, GraphQL, etc.) required to answer the user's original query. The TPostP may use information from the TPreP to populate query parameters (e.g. Customer names, DateTimes), and apply the PQR's pending transformations to generate a query in the original database query language.

Exemplary graphs 113 and database 115 are shown in FIG. 1B. Graphs 113 and database 115 may include graphs related to the database schema, graphs representing user groups (e.g. sales, marketing, engineering, management, customer care, service and support), or domain-specific knowledge graphs containing information about the domain in question (e.g., supply chain, customer relations, accounting, warehousing, power supply, information technology). Such graphs 113 and database 115 can be used to enhance the performance of the systems that are performing blocks 156 and 157.

Figure 1C:
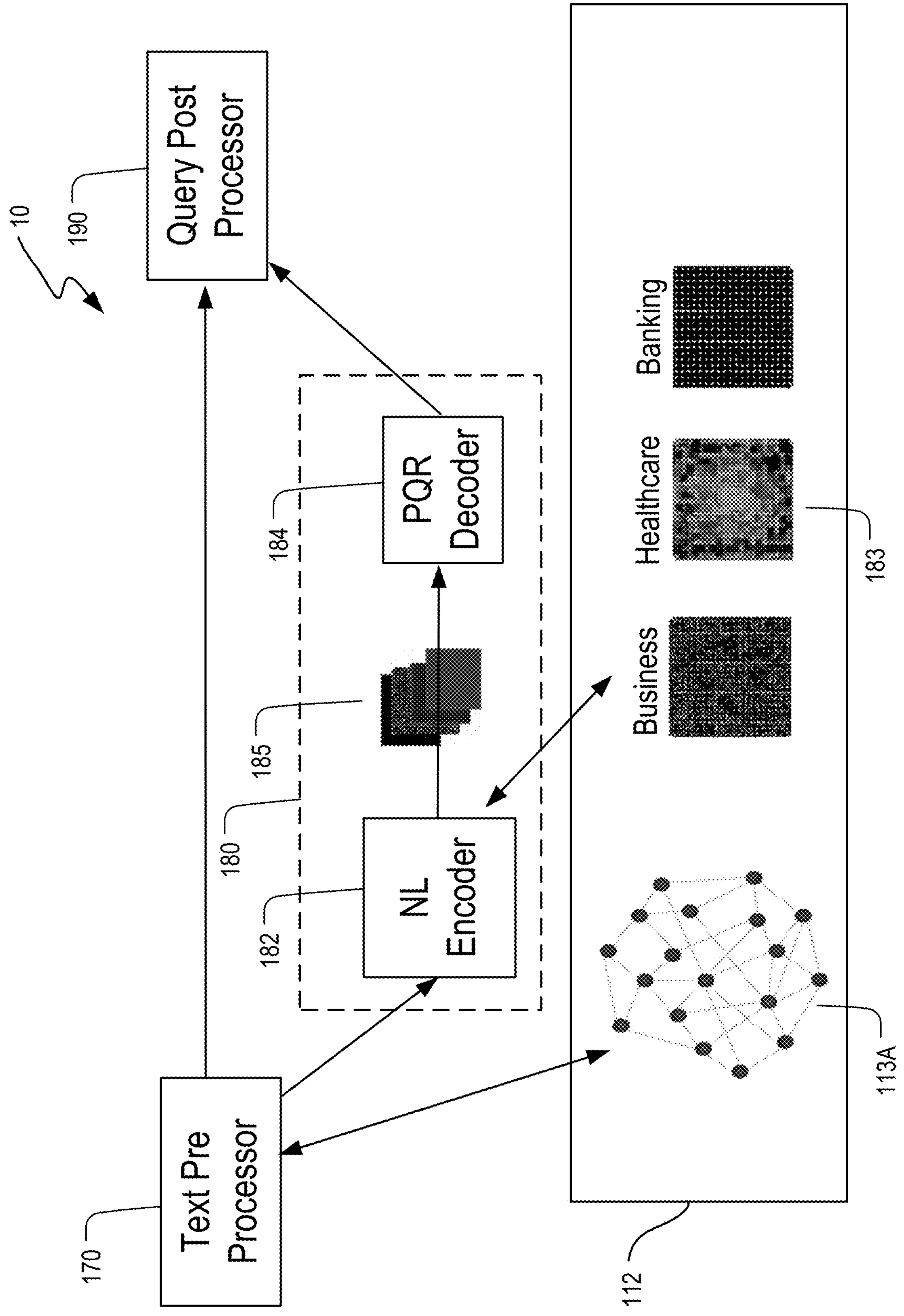
FIG. 1C is a block diagram of an exemplary system for implementing a model inference process shown in FIG. 1B.

FIG. 1C is a block diagram of an exemplary system 10 for implementing model inference process 150. System 10 translates a natural language query into an executable query in a particular database query language. System 10 comprises a text preprocessor (TPreP) 170 for receiving a natural language query in step 156, a Neural Parser (NP) model 180 for generating a PQR in step 157, and a query post processor (TPostP) 190 for converting the PQR to a database-specific query language in step 158 of the FIG. 1B process 150.

TPreP 170 converts a user's natural language query into a hashed logical query by extracting and hashing entity information such as canonical terms, date/time, and/or the like. TPreP 170 also extracts domain information and user preferences/biases from the user's natural language query using query history and/or a knowledge graph 113A. The extracted logical query along with the domain and user context information is passed into the NP model 180.

NP model 180 includes an NL encoder 182 and a PQR decoder 184. NL encoder 182 includes a transformer language model and a graph attention model that jointly encode the extracted logical query through a knowledge augmented attention mechanism 185. NL Encoder 180 may utilize the domain and user contexts obtained from TPreP 170 to generate multiple projections of a knowledge graph through a causal graph attention mechanism 183. Illustratively, causal graph attention mechanism 183 may generate differential importance embeddings of different entities and related attributes for the domains/user-groups of interest.

In some embodiments, the transformer language model of NL encoder 182 also simultaneously generates a language attention embedding for the word tokens in the query. In such embodiments, the two types of embeddings may be concatenated by NL encoder 182 to generate a knowledge augmented encoding. This knowledge augmented encoding (i.e., encoded query representation) is then decoded into PQR by PQR decoder 186.

TPostP 187 receives the decoded PQR from NL model 180 and entity information from TPreP 170. TPostP 187 may utilize database-specific language transformation rules to generate a database-specific query language (DBQL) query from PQR in step 158. The DBQL query can then be executed against a given database in step 159.

Advantages of using PQR for inference include support for a large number of query operations performed by PQR nodes, shortened query lengths, which reduces inference time and opens up the possibility of using alternative model architectures which are not feasible when outputting extremely long database queries. PQR removes several tokens from the DBQL which do not necessarily contain much semantic information (e.g., certain table/column names, SQL keywords). This makes the task easier for the model, as there is less redundant information that needs to be learned, and this aids in improving generalization and performance.

Figure 2:
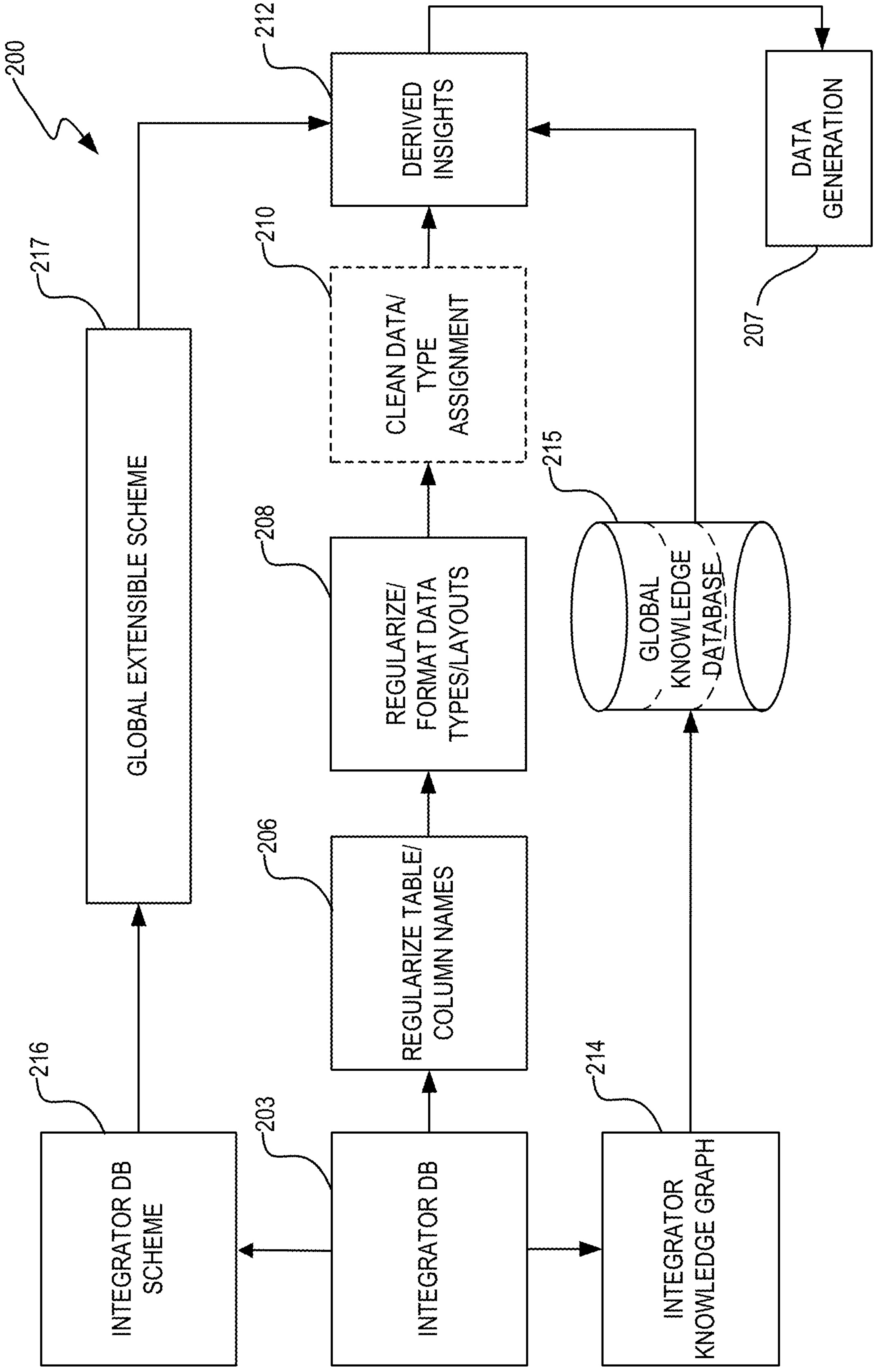
FIG. 2 is a flowchart of a process as implemented by a database insights engine.

FIG. 2 is a flowchart of a process 200 as implemented by a database insights engine (such as the database insights engine 107 of FIG. 1A). The process 200 begins with integration database connection (block 203) and ends with the generation of training data at block 207. Users connected to integrator database 203 provide database insights. Insights are also drawn automatically from knowledge graphs and global knowledge databases. Such database insights may be in the form of how a database schema can map to a semantic business domain and the types of natural language queries that may be applicable. Regularization of the data is then performed at blocks 206 and 208. At block 206, the naming conventions of tables and columns are regularized and converted to human understandable forms, including implicit and explicit variations. At block 208, the data types and layouts are regularized and converted to standard formats. The regularized data is then provided for cleaning and type assignment at block 210. Cleaning and type assignment may happen in cases were the user would want to perform mathematic operations on data in a column, but its data type in the integrator's database is of a string category or it is a special data type only defined for a particular database. At block 210, such columns are mapped to an appropriate standard data type such as int, float, datetime, etc. so that applicable operations can be performed on them.

As part of process 200, in order to build a scalable API that allows users to query databases using natural language, different database structures are first transformed into a unified data model which acts as an adapter between databases and can be used for automated data generation and model training systems.

A local integrator database scheme 216 is built and mapped to a global extensible scheme 217. A local integrator knowledge graph 214 is built and mapped to a global knowledge database 215. At the start of an integration process of a new database, this system has a static global database schema and a static knowledge graph. During the integration process, the current database entities are regularized for naming conventions, data types and join paths. Then the regularized schema is semantically mapped onto the static global schema. This process is informed by a static global knowledge graph in the global knowledge database and the mapping occurs within heuristically determined semantic bounds. Database entities that lie outside the bounds and cannot be mapped are then used to extend the global schema into an intermediate state. The extension process is also informed by the static knowledge graph. Once this integration is complete, data from a particular database instance as well as integrator specific documentation, acquired directly from clients or through a process of data mining, are used to build an integrator specific knowledge graph as well as extend the static global knowledge graph. Once this process is complete, the whole schema mapping and extension process is repeated once, using the updated global knowledge graph, integrator-specific knowledge graph and the intermediate global database schema. This finally generates the unified data model as data adapter—a new version of a static knowledge graph and a static global database schema that has incorporated the latest integrator.

At block 212, insights on the semantic, structural and data-driven relational groupings within databases are derived using a combination of semantic relation extraction, and information mining from previously seen data models/knowledge graphs. These insights are used to guide the data generation process 207 by providing relevant insights into the database and suggestions for useful queries, thereby informing the semantic multiplier in the query building process. Importantly, this system continually builds a data warehouse for different schemas and data models and thereby builds intelligence to continuously improve the end-to-end system.

Embodiments of the invention use a query representation that allows training data corpuses to be built from a business domain subject standpoint and maintains consistency of that aspect of the database query language for automated training data generation. In particular embodiments, the query representation comprises a protoquery representation (PQR), as next explained with reference to FIGS. 3A and 3B. PQR may be used in a training data generation process 300, as seen in FIG. 3A, and in a model inference process 350, as seen in FIG. 3B.

Figure 3A:
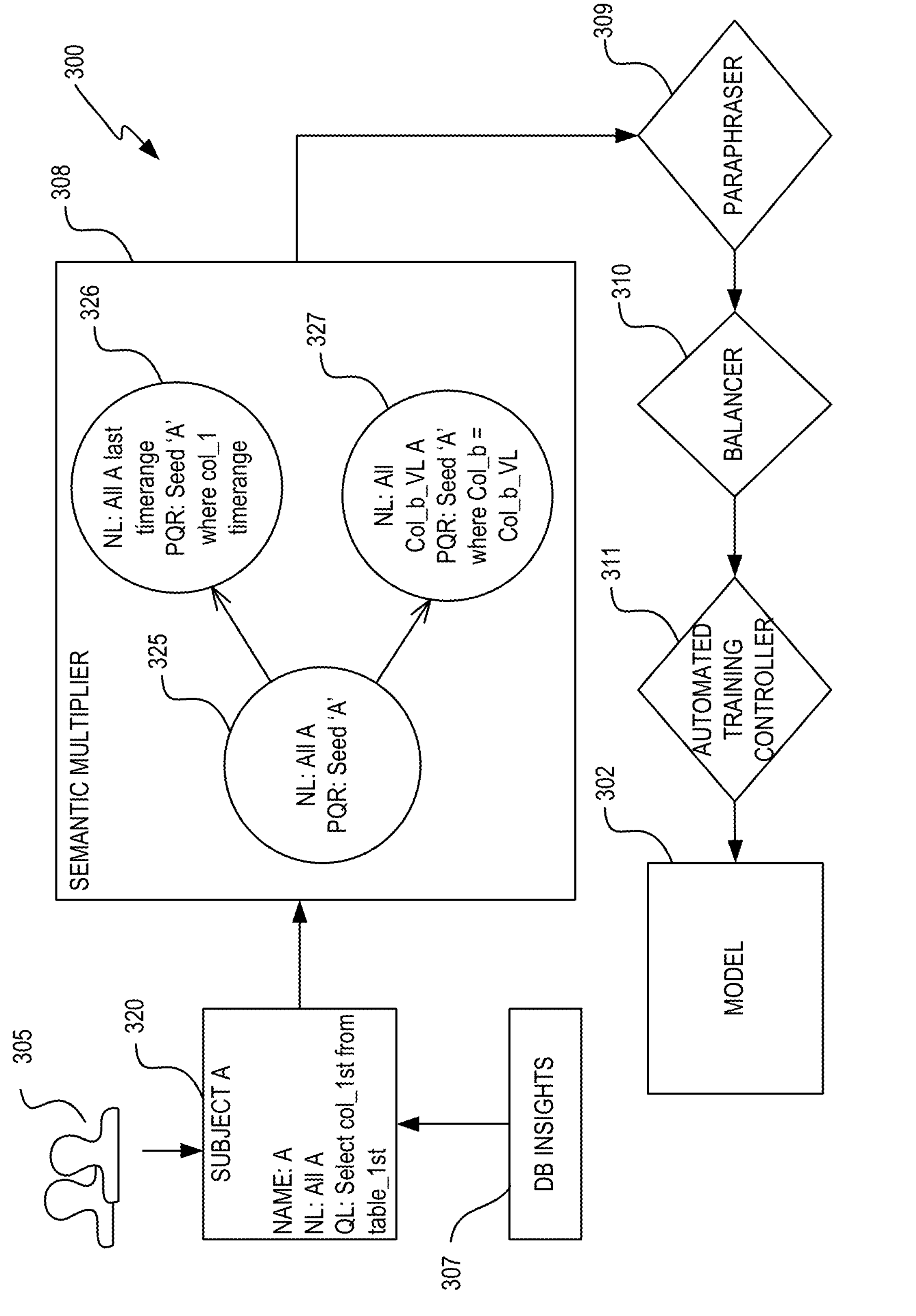
FIG. 3A shows the semantic multiplier building a PQR in the training data generation pipeline and FIG. 3B shows the conversion of PQR into a specific database query language in model inference.

As seen in FIG. 3A, data generation process 300 begins with a subject seed query (SSQ) 320. The subject seed query 320 may be generated automatically from database insights engine 307 or it may be provided as a user (trainer) input 305. The SSQ describes how a subject in the logical domain is mapped to the physical database model. In the illustrated example, the SSQ consists of a Subject A, represented with the name "A" in the logical domain, "All A" in a natural language query, and "Select col_1st from table_1st" in database query language such as SQL.

To build additional queries for the model, queries may be semantically multiplied at block 308. In particular embodiments, a corpus graph is built of nodes, each comprising a natural language query and a PQR pair. The progenitor 325 of a subject corpus graph is the natural language query in the SSQ and a pointer to the SSQ (e.g. All A/seed 'A' where SSQ was created for Subject A). In child nodes 326, 327 of the corpus graph, a new PQR is defined by adding pending transformations or modifications to the SSQ. In the illustrated example, child node 327 has a PQR seed 'A' with a pending transformation of "Col_b=Col_b_VL" (e.g. col_2='Customer Unique Identifier'), and child node 326 has a PQR seed 'A' with a pending transformation of "where col_1 timerange" (e.g. timerange=last month). Semantic multiplication along with the remaining steps at blocks 309, 310, 311 in the data training generation process 300 can be performed to automatically build a corpus of PQR consisting of a broad distribution of relevant conditions applicable to the subject and target physical database. Business subjects or other semantically-related subjects created with PQR can also be used with other PQR subjects and peripheral knowledge bases, to automatically generate new database queries that are important to the business domain.

Figure 3B:
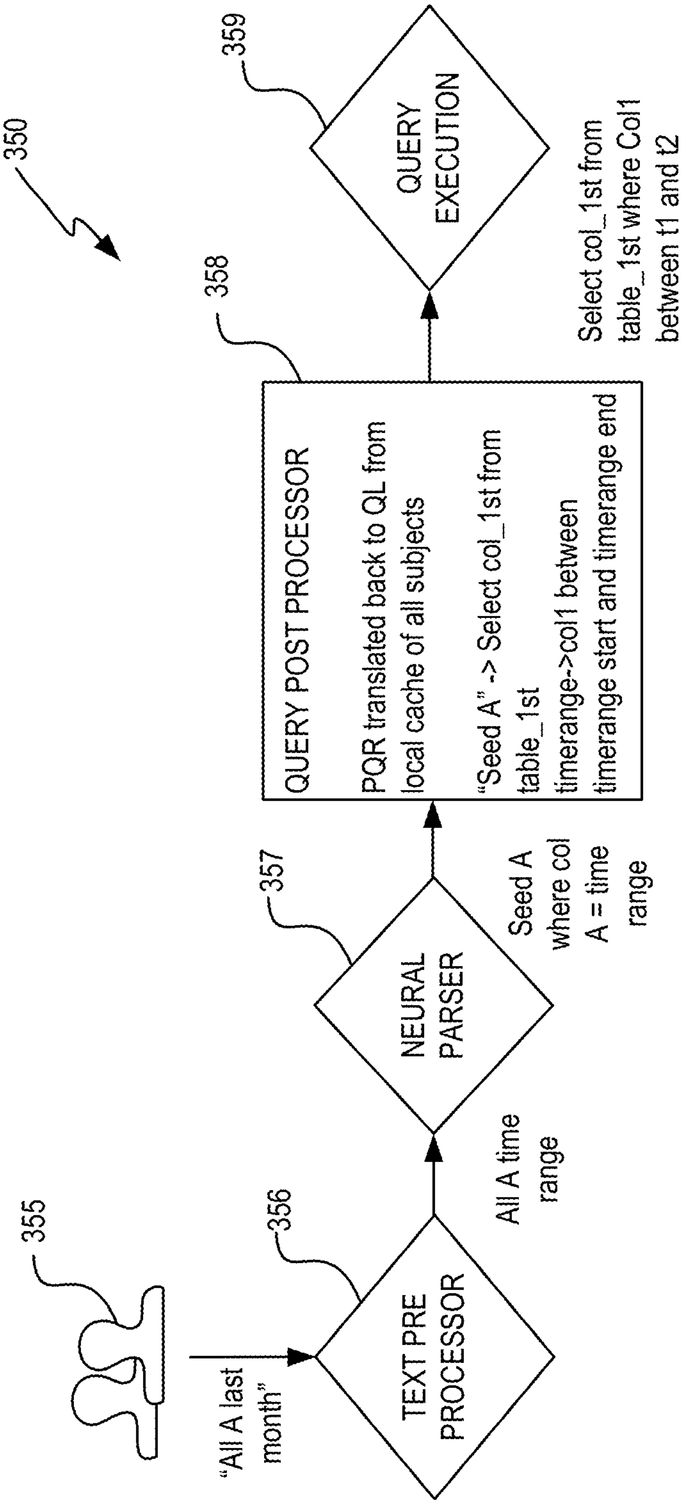

As seen in FIG. 3B, PQR can also be used in the inference process 350 with a trained model. For a particular natural language query provided by a user 355 (e.g. "All A last month"), a PQR is generated by the neural parser at block 357, and the Query Post Processor (QPP) 358 translates the PQR back to the physical database representation of the query with all augmentations of the PQR added into the target database query language. The database query can then be executed at the query execution step at block 359.

Representing a query in a PQR has particular advantages for delivering highly accurate and adaptable models that are easy to change and maintain. Since PQR is separated from the model architecture itself, if there is an error in the target database query language of the SSQ in the training data, the training data (represented using PQR) can be changed at the SSQ level, without having to re-train the model or regenerate the training data with the changes. In the case subject A in FIG. 3A, suppose SSQ 320 was "revenue" which in the case of a query "all revenue" would return a list of invoices. After the model was trained, the user might realize the incorrect data was being returned, because in the case of that database schema, "revenue" was in the invoice table, but required a condition where "invoice type"="revenue". In this case, the trainer of the model would just have to add this where condition to the query language in SSQ 320 and not have to train the model again.

According to embodiments described herein, the data generation pipeline enables controllable natural language generation wherein biases can be injected, controlled and utilized such that trained models behave differently for different user groups in accordance with the application requirements. In addition, the data generation pipeline enables remedial natural language generation to ensure that the different categories of end users can use natural language for making database queries to the system. In particular, the training data is generated for varying degrees of natural language fluency and keyword distributions in a controlled and reproducible manner.

Figure 4:
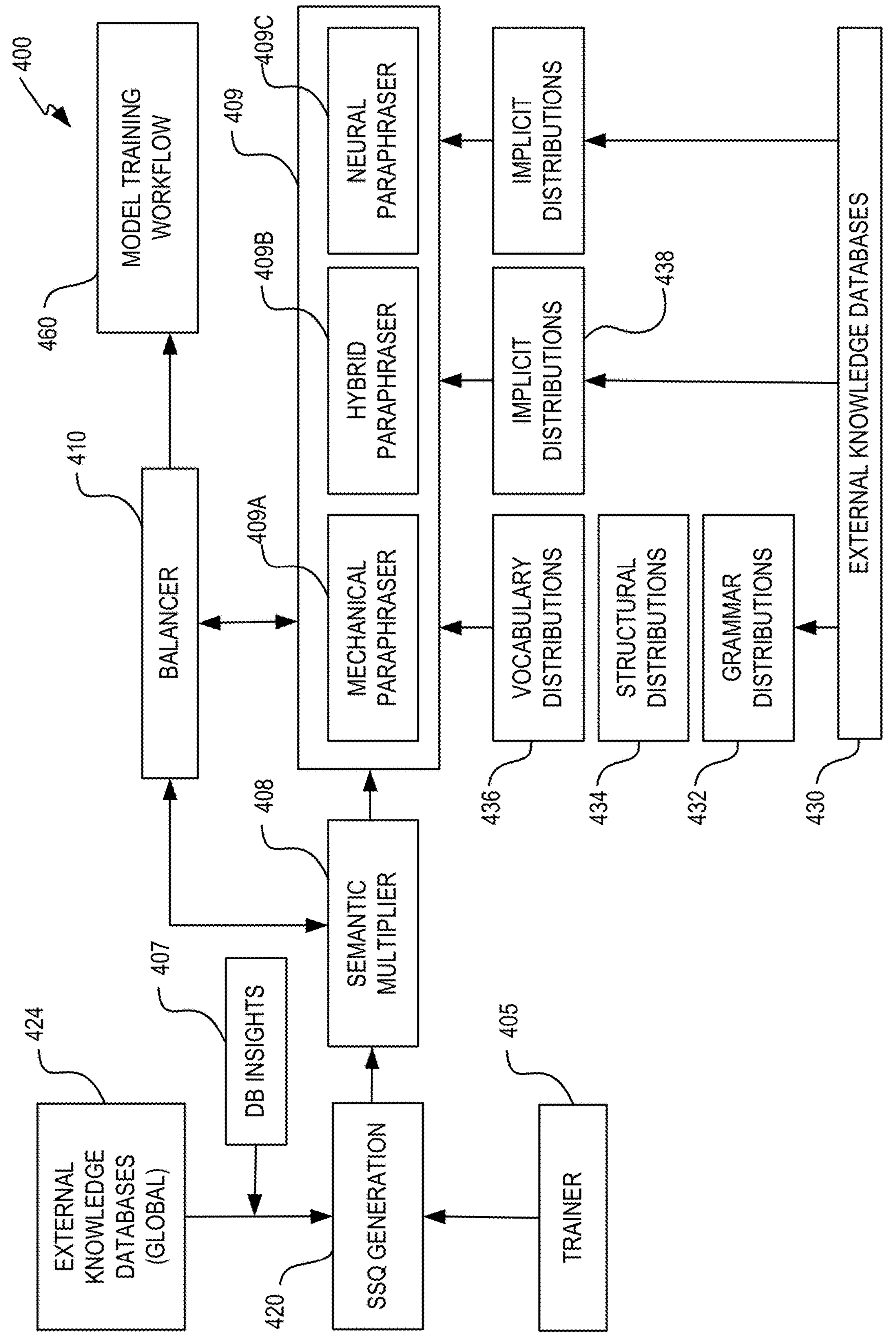
FIG. 4 shows a flowchart of a process for training data generation, from obtaining database insights through to the model training phase.

The controllable aspect of natural language generation can be provided through a process 400 as illustrated in FIG. 4. The process begins with SSQ generation at block 420 using automated and/or human-in-the-loop curation workflows that are domain and language specific. For example, a combination of human trainers 405, database insights 407 and knowledge graphs and databases 424 may be employed to generate SSQs as described elsewhere in the disclosure herein. Next, semantic multiplication of the SSQs and other multiplied NL/PQR pairs is performed at block 409 to cover applicable common database query conditions such as filters, groupBy, datetime, etc. Queries are then categorized, ranked, sorted and filtered into different bins (e.g. grammar distributions 432, structural distributions 434, vocabulary distributions 436, and implicit distributions 438). The binning of the queries allows the creation of different data distributions. The queries are then passed through a paraphraser 409 which uses statistical models (as represented by mechanical paraphraser 409A), deep-learning language models (as represented by neural paraphraser 409C), and hybrids of statistical and deep-learning language models (as represented by hybrid paraphraser 409B) to create different variants of natural language queries and their paraphrases. Balancing of natural language queries alongside the database queries is performed at block 410. The external knowledge databases 430 informs this paraphrase generation process in 409 and aids in domain adaptation of the training data. Balancing removes anomalous data and aims to balance the training data so that phrases and clauses are understood and interpreted with optimal importance, regardless of whether they are in a minority class of data, for example. In particular embodiments, balancing of training data at block 410 is adjusted and self-supervised by the feedback coming back from real-time usage/test data. In such a way, the training data is not only balanced for the output language to be generated, but can also bear controlled biases to serve different end user groups differently.

At block 460 of process 400, a model analysis and decision system is employed to perform automated, real-time optimizations for training and managing models. For example, in one embodiment, an automated training controller (ATC) trains the NL2DBQL model adaptively in a controllable and reproducible manner using hybrid (combined statistical and neural learning models) techniques. The ATC is described further below, with reference to FIG. 5.

Figure 5:
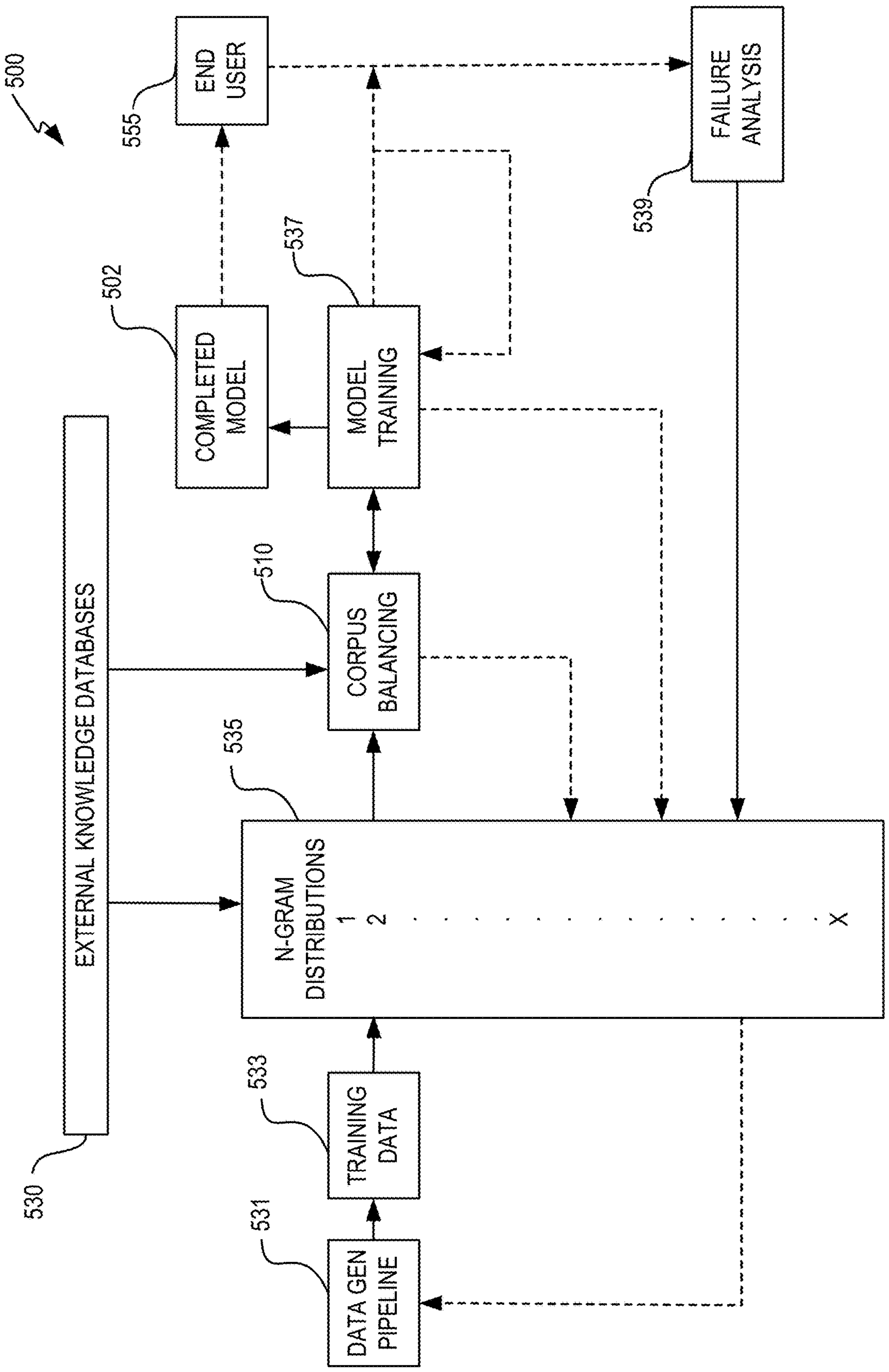
FIG. 5 shows a flowchart of a process for automated training/model optimization, including training data generation, model training, training data correction, failure analysis and feedback loop.

FIG. 5 is a flowchart of a process 500 for automated training/model optimization which yields a completed model 502 that can be deployed to end users 555 for model inference. Process 500 begins with training data generation through a pipeline at block 531, which for example can be the data generation pipeline illustrated by process 400 of FIG. 4. Data generation at block 531 produces training data 533. Training data 533 is optimized through the subsequent steps of process 500. In one particular embodiment, training data is defined to be "optimal" where it accounts for divergence in model usage across different end user groups. Optimality is achieved by the system, automatically and adaptively by projecting the data distribution (pairs of natural language questions and corresponding database queries) onto a segmented text distribution (such as an alternate n-gram distribution) at block 535. Subsequently, control signals from one or more of corpus balancing at block 510, model training at block 537 and failure analysis at block 539, are applied to adaptively determine data optimality for the segmented text distribution, which is then transformed back into pairs of natural language questions and corresponding database queries.

At blocks 510 and 537, hyperparameter settings are determined to extract optimum performance. For example, non-standard training data generation parameters like number of nodes in the PQR state graph, number of natural language pluralities, heterogeneity of segmented text distributions, data mapping factor for logical data model, data mapping factor for knowledge graphs etc. and standard model training parameters such as batch-size, batch augmentation policy, optimization algorithm, learning rate, settings for early stopping, and confidence thresholds for failure analysis, etc., yield different model behaviors for different training data distributions, and are tuned in a closed loop. The system does this tuning automatically, in-sync with the search for optimal training data distribution at block 535. The embodied closed loop architecture for training data generation and model training provides a very high degree of controllability, adaptability and reproducibility in comparison to GAN-type architectures.

Model performance on different training data distributions is balanced using a new four-part evaluation metric that has been developed though experimentations and leveraging Exploratory Model Analysis (EMA). Part 1 of the metric takes into account the failure analysis of test and validation test sets that are either derived from end-user interactions or by a human trainer. Part 2 of the metric accounts for the model performance for different artificially generated test datasets. These artificial test sets are particularly designed to measure model performance (accuracy, precision and bias), domain-specific adaptation of models and model confidence and stability across different text segmentations. Part 3 of the metric analyzes activation patterns of the deep learning NLP model (primarily the transformer architecture). Recent academic research in the field has shown that such model architectures have two types of model weights (activations): one type of weights have high magnitudes throughout training and another type of weights that change in magnitude more than the rest, throughout a training process. We have further developed on this understanding and found that the weight distribution of both these types of weights display characteristic patterns in response to different data distributions. For example, a model biased towards a particular user group would differ in these characteristic patterns to a completely unbiased model or to a model biased towards another user-group. Part 3 of the metric learns to quantify these characteristic patterns and their relations to different optimal training data distributions in an offline pre-training process over a search grid of diverse data distributions. In real-time while training datasets specific to an integrator, the learned metric detects desirable weight patterns in the model in response to change in training data distributions. Part 4 of the metric is a complement of the patterns discussed in Part 4. Training data distributions that can produce differential activation (or change in weight magnitude) for weights that are least active throughout a training process are analyzed in part 4. A training dataset that can increase excitation in otherwise mostly redundant model weights, tend to contain rich language patterns that can aid model generalization. A training dataset and a combination of model tuning hyper-parameters, that give the best performance overall with respect to all these 4 parts of the evaluation metric is deemed an optimal training data distribution and subsequently it produces an optimally trained NL2DBQL model.

Conventional automated model management tools attempt to find an optimum combination of model architecture, hyperparameter settings, optimization algorithms etc. that performs best on a given test data for a fixed training data or augmented benchmark datasets. In contrast, the embodied automated training controller develops predictive capabilities on top of an EMA system using the four-part metric. The embodied automated model management finds best hyperparameter settings for each unique type of generated training data distribution that targets unique (one or more) groups of users. Each user-targeted optimal dataset distribution and complementary hyperparameters generates an optimal model bearing a unique model version. Each model version may further have subversions based on the different kinds of weight distributions that are utilized in the metric for the same or a pruned/reduced architecture. Such subversions indicate different model performances in terms of speed, latency, memory and accuracy.

In embodiments of the NL2DBQL automated model management system described herein, natural language generation is enhanced by adapting datasets and models to different business (application) domains catering to different categories of end users. Since the system accounts for the divergence in model usage across different user groups in finding an optimal training data distribution, it can also control the degree and nature of this divergence to train models that behave differently for different user groups. Data from external knowledge databases 530 relating to different domains can be used as inputs to aid in balancing of the training data at block 510 and optimization of the performance of training data at block 535.

Model architectures are optimized and/or reduced at block 537 to meet performance requirements such as speed, training time, deployment time, and the like. For example, let a model that can adapt to all different user-groups U={u1, u2, u3, . . . un} be defined as a full model architecture (Mfull). By applying different architecture reduction techniques such as pruning, distillation and sparsification techniques (e.g., Lottery Ticket Hypothesis) to yield characteristic generalization on differently tuned test data distributions, smaller model architectures can be generated. These smaller model architectures specialize to different subsets of user-groups (e.g., M1-5-9 is a specialized model for user groups {u1, u5, u9}), where it sacrifices adaptation to the other user groups in order to gain improved inference speeds, training time, etc.

At block 539, validation and test case failures are analyzed to take corrective actions on the optimal training data of block 535. As seen in FIG. 5, the optimal training data generation and model optimization/reduction occurs in a feedback loop where the system continually adds different test data distributions and analyzes validation and test case failures by projecting them to the same segmented text distribution (at block 535) to which the training data belongs. This analysis exposes weaknesses (sub-optimality) in the training data which can then be corrected by the controllable data generation pipeline.

Using the recorded end user data from end users 555, further adjustments can be made to drive improvements in generalization. A system which continually adds test data distributions to auto-correct sub-optimal training data uses pre-recorded end-user data in one of three ways: (a) by directly adding test cases to test data; (b) to seed a test data generator; and (c) for distribution matching between output of a test data generator and pre-recorded end-user data to control test data sampling for the test data generator output.

Figure 6:
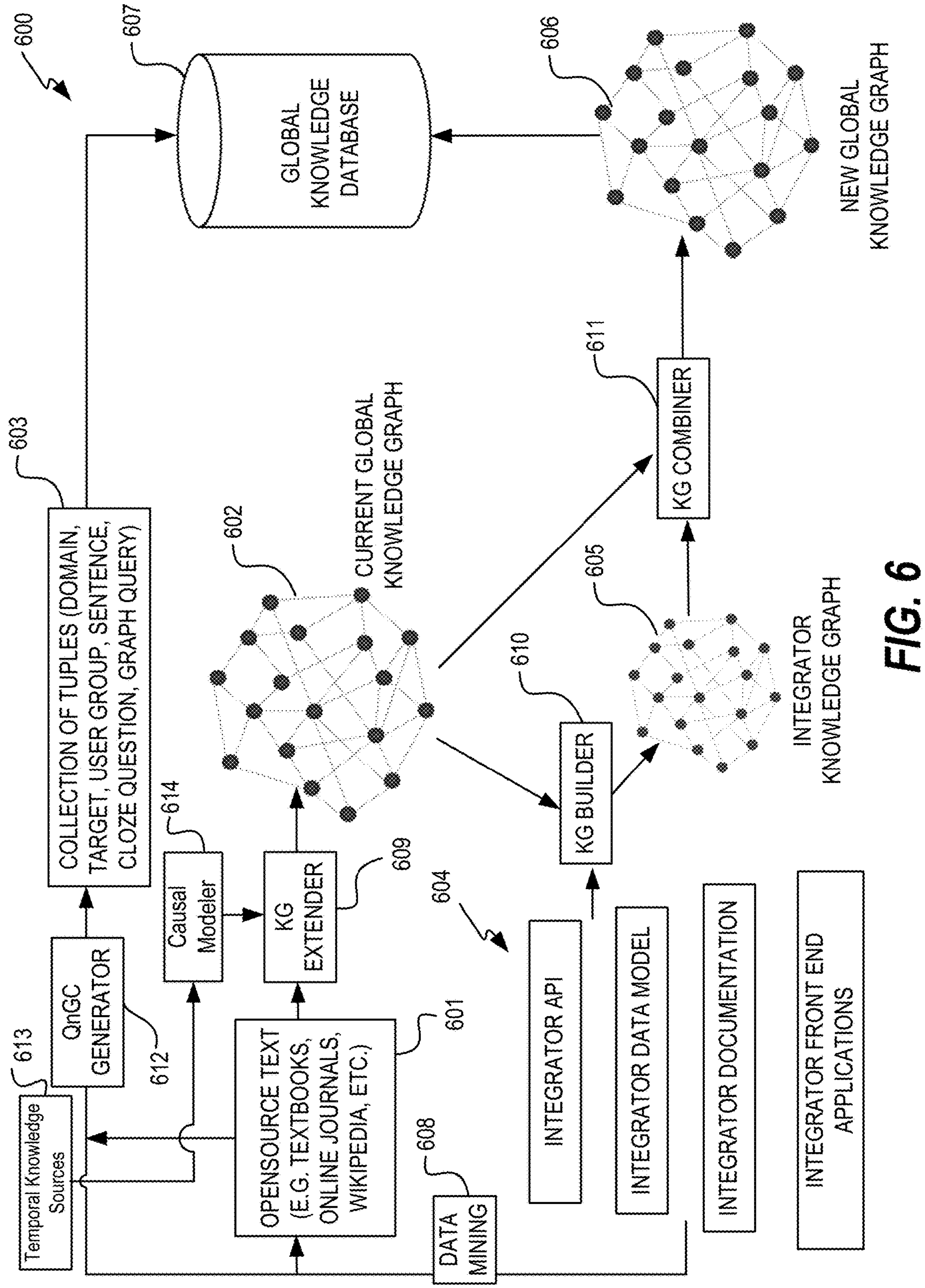
FIG. 6 shows a flowchart of a process for building knowledge graphs and global knowledge bases for specific integrators, domains and user groups.

Referring next to FIG. 6, in accordance with a process 600 the above-described NL2DBQL systems and methods generate topic-specific corpora automatically and dynamically and build semantic knowledge bases and knowledge graphs to inform the database insights engine and training data generation pipeline for domain adaptation. Data mining is performed at step 608 using data mining techniques such as web-scraping, crawling, optical character recognition (OCR) models, and data cleaning, and are triggered and controlled automatically by keyword distributions within the metadata of an integrator's data model and documentations provided by the integrators 604 themselves. In certain embodiments, the system may also crawl and mine metadata from an integrator's front-end applications and/or APIs with granted access and permissions. The metadata is used to define pertinent domains (e.g. supply chain, customer relations) and user groups (e.g., sales, customer-care). Combinations of domains and user groups make up different topics for the data mining process, which implements different topic-based data search, extraction and cleaning algorithms. Data may also be mined from temporal knowledge sources 613 (e.g., news, social media, online posts, marketing releases, social events, public events, etc.). Temporal knowledge sources 613 may also include temporal information (e.g., flights, stock trading, etc.) collected by monitoring changes on different websites.

A causal modeler 614 may perform correlation and causality analysis on different combinations of temporal knowledge sources 613. Causal modeler 614 may perform the analysis under distinct optimized context use-cases, topics and/or domain-specific applications to generate causal features. For example causal modeler 614 may establish cause-effect relationships between one or more of the following: knowledge sources (e.g., databases, documents, front end interfaces) across different domains and platforms from which information is sourced, the importance of such sourced information to a given user group in making decisions (e.g., business decisions, supply-chain management, industrial process management, marketing communication, planning, scheduling, etc.), temporal information (e.g., time of day, week or month, yearly quarters, etc.), and external events (e.g., weather patterns, stock market trades, etc.). Since the interaction objectives of a user or user group, when interfaced with a NL2DBQL API, can dynamically change depending on the above factors and their causal relationships, causal modeler 614 can directly impact the type of queries that are inputted to the API and indirectly impact the expected output from the language models. Illustratively, combining causal modeling with NL2DBQL can optimize query workflows and interactions for different users (or user groups) based on the information that is most relevant for individual use-cases and objectives.

From the mined topic-specific corpora 601, a knowledge graph extender 609 uses a combination of new algorithms, statistical and neural language models to extend a global knowledge graph 602 to a current state. Similarly to the system employed by knowledge graph extender 609, a knowledge graph builder 610 builds a new integrator knowledge graph 605 from the integrators' metadata. A knowledge graph combiner 611 combines the integrator knowledge graph 605 with the current global knowledge graph 602 to output a new global knowledge graph 606. Each of the three states of knowledge graphs may be maintained on separate topic-wise versioning systems. The new global knowledge graph 606 at the end of process 600 embodies knowledge from a set of different topics pertinent to a particular integrator. This knowledge graph is then combined with a global knowledge database 607 that houses artifacts for all topic (domains and user-groups). This global knowledge-base facilitates continuous maintenance and expansion of the unified data adapter by informing the database insights engine.

From the mined text data of data mining step 608, a QnGQ generator 612 implements neural models to automatically generate cloze form questions and statistical models to generate corresponding graph queries that would extract an answer to a particular question from a knowledge graph. Each such pair of question and graph query is attributed to a domain and user-group defined by the integrators metadata. The tuples 603 generated by QnGQ are stored in the global knowledge base 607 and further facilitates the downstream integration of the adapter into the data generation pipeline, particularly in hybrid paraphrasing. They are also utilized by different distribution matching and data mapping algorithms for domain adaptation of training data and in generating query suggestions that potential end users may benefit from in the semantic multiplier.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A computer-implemented method for controlled generation of a corpus of optimized datasets for training a machine learning-based model of a natural language interface to a database, the method comprising:

(a) receiving insights data regarding the database from a database insights engine, and based at least in part on the database insights data automatically generating a plurality of subject seed queries, each of the plurality of subject seed queries mapping a subject in a logical domain to a physical model of a schema of the database;

(b) generating a plurality of database queries by performing semantic multiplication of the plurality of subject seed queries;

(c) generating a data distribution of natural language queries paired with corresponding database queries by, for each one of the plurality of database queries, pairing the database query to a natural language query and one or more paraphrases of the natural language query;

(d) projecting the data distribution onto a plurality of segmented text distributions and applying one or more control signals to automatically determine an optimal training data distribution, wherein the control signals are provided from one or more of an external knowledge database, a training data balancer, a model training system, and a failure analysis system; and (e) transforming the optimal training data distribution into pairs of natural language queries and corresponding database queries to generate the corpus of optimized training datasets.

2. The method of claim 1 comprising automatically tuning a plurality of hyperparameter settings in determining data optimality for the segmented text distribution.

3. The method of claim 2 wherein the plurality of hyperparameter settings comprise one or more of: number of nodes in a Protoquery Representation (PQR) state graph of the plurality of database queries, number of natural language pluralities, heterogeneity of segmented text distributions, data mapping factor for logical data model, and data mapping factor for knowledge graphs.

4. The method of claim 1 wherein at least one of the segmented text distributions comprises an alternate n-gram distribution.

5. The method of claim 1 wherein the plurality of database queries are database representation queries in the form of executable state graphs.

6. The method of claim 5 comprising generating a new test dataset and projecting the test dataset to the n-gram distribution to identify sub-optimality in the training data distribution.

7. The method of claim 1 comprising translating the seed queries into query representations and converting each one of the query representations to a corresponding one of the additional database queries with one or more pending transformations using data specific syntactic configurations.

8. The method of claim 7 wherein the query representation comprises a protoquery, the method comprising generating nodes in a proto query state graph wherein each node comprises a proto query condition paired with a corresponding natural language query.

9. The method of claim 1 comprising determining one or more paraphrases of the natural language query by employing statistical language models, knowledge graphs and/or neural network language models.

10. The method of claim 1 comprising generating a plurality of training data distributions through categorizing, ranking, embedding, sorting and/or filtering the plurality of database queries.

11. The method of claim 1 comprising employing statistical language models and/or neural network language models to convert naming conventions and formats used in the database to standardized conventions and formats.

12. The method of claim 1 wherein the natural language queries are drawn at least in part from a causal knowledge graph modeled to account for language biases across different domains and user groups.

13. A method for controlled training and optimization of a natural language to database query language ("NL2DBQL") model for a natural language interface to a database, the method comprising:

(a) receiving a controllable corpus of training data for the model, the controllable corpus of training data comprising a plurality of natural language queries paired with corresponding database queries, wherein the plurality of database queries is generated by performing semantic multiplication of a plurality of subject seed queries mapping a subject in a logical domain to a physical model of a schema of the database, wherein the plurality of subject seed queries is generated based at least in part on insights data regarding the database;

(b) applying the corpus of training data to train the model;

(c) projecting a data distribution of the corpus of training data onto a segmented text distribution and applying control signals to automatically determine data optimality for the segmented text distribution, wherein the control signals are provided from one or more of an external knowledge database, a training data balancer, a model training system, and a failure analysis system;

(d) generating an optimal training data distribution by transforming the segmented text distribution into optimized pairs of natural language queries and database queries; and (e) applying the optimal training data distribution to re-train the model.

14. The method of claim 13 comprising iteratively modifying the segmented text distribution based on causal events and temporal triggers provided by the external knowledge database.

15. The method of claim 13 comprising tuning a plurality of hyperparameter settings in determining data optimality for the segmented text distribution.

16. The method of claim 15 wherein the hyperparameter settings comprise one or more of: batch-size, batch augmentation policy, optimization algorithm, and learning rate.

17. The method claim 13 wherein the segmented text distribution comprises an alternate n-gram distribution.

18. The method of claim 13 comprising analyzing, by the failure analysis system, validation and test case failures and adaptively correcting for sub-optimal training data.

19. The method of claim 18 comprising using a knowledge graph to analyze cause-effect dynamics of the validation and test case failures and adaptively correcting for sub-optimal training data by quantifying the cause-effect dynamics for different user groups and business domains.

20. The method of claim 13 comprising obtaining pre-recorded end user data and using the end user data to add test cases to an iterative training feedback loop.

21. The method of claim 13 comprising obtaining pre-recorded end user data and using the end user data to seed a test data generator.

22. The method of claim 13 comprising obtaining pre-recorded end user data and using the end user data for distribution matching between an output of a test data generator and pre-recorded end user data to control test data sampling for the test data generator output.

* * * * *